(12) United States Patent
Subrahmanyam et al.

(10) Patent No.: US 7,006,330 B1
(45) Date of Patent: Feb. 28, 2006

(54) HEAD STACK ASSEMBLY INCLUDING A GROUND CONDUCTIVE PAD FOR GROUNDING A SLIDER TO A GIMBAL

(75) Inventors: Jai N. Subrahmanyam, Santa Clara, CA (US); Darrell D. Palmer, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 238 days.

(21) Appl. No.: 10/386,259

(22) Filed: Mar. 10, 2003

(51) Int. Cl.
  *G11B 5/48* (2006.01)
(52) U.S. Cl. .................................. 360/234.5
(58) Field of Classification Search ............ 360/234.5, 360/234.6, 245.8, 245.3
  See application file for complete search history.

(56) References Cited

U.S. PATENT DOCUMENTS

| | | | | |
|---|---|---|---|---|
| 5,657,186 A | * | 8/1997 | Kudo et al. ............... | 360/234.5 |
| 5,864,445 A | * | 1/1999 | Bennin et al. ............ | 360/245.9 |
| 5,896,248 A | * | 4/1999 | Hanrahan et al. ......... | 360/234.5 |
| 6,515,832 B1 | * | 2/2003 | Girard ...................... | 360/245.3 |
| 6,621,661 B1 | * | 9/2003 | Ichikawa et al. ......... | 360/234.5 |
| 6,700,748 B1 | * | 3/2004 | Cowles et al. ............ | 360/245.9 |

* cited by examiner

*Primary Examiner*—Angel Castro
(74) *Attorney, Agent, or Firm*—Stetina Brunda Garred & Brucker

(57) ABSTRACT

A head stack assembly includes an actuator including an actuator arm, a load beam coupled to the actuator arm, and a gimbal coupled to the load beam. The gimbal is formed of an electrically conductive material. The head stack assembly further includes a dielectric layer disposed upon the gimbal. The head stack assembly further includes a slider supported by the gimbal. The head stack assembly further includes slider conductive pads disposed upon the dielectric layer with the dielectric layer interposed between the slider conductive pads and the gimbal. The slider conductive pads are electrically connected to the slider. The head stack assembly further includes a ground conductive pad disposed upon the dielectric layer with the dielectric layer interposed between the ground conductive pad and the gimbal. The ground conductive pad is electrically connected to the slider and the gimbal for electrically grounding the slider.

24 Claims, 4 Drawing Sheets

HEAD STACK ASSEMBLY INCLUDING A GROUND CONDUCTIVE PAD FOR GROUNDING A SLIDER TO A GIMBAL

CROSS-REFERENCE TO RELATED APPLICATIONS

Not applicable.

BACKGROUND OF THE INVENTION

1. Field of the Invention

The present invention relates generally to disk drives, and in particular to a head stack assembly including a ground conductive pad for grounding the slider to a gimbal.

2. Description of the Prior Art

The typical hard disk drive includes a head disk assembly (HDA) and a printed circuit board assembly (PCBA) attached to a disk drive base of the HDA. The head disk assembly includes at least one magnetic disk, a spindle motor for rotating the disk, and a head stack assembly (HSA). The spindle motor includes a spindle motor hub that is rotatably attached to the disk drive base. The hub has an outer hub flange that supports a lowermost one of the disks. Additional disks may be stacked and separated with annular disk spacers that are disposed about the hub. The head stack assembly has an actuator assembly having at least one transducer head, typically several, for reading and writing data from and to the disk. The printed circuit board assembly includes a servo control system in the form of a disk controller for generating servo control signals. The head stack assembly is controllably positioned in response to the generated servo control signals from the disk controller. In so doing, the attached heads are moved relative to tracks disposed upon the disk.

The head stack assembly includes an actuator assembly, at least one head gimbal assembly, and a flex circuit cable assembly. A conventional "rotary" or "swing-type" actuator assembly typically includes an actuator having an actuator body. The actuator body is configured to rotate on a pivot assembly between limited positions about an axis of rotation. A coil support extends from one side of the actuator body. A coil is supported by the coil support and is configured to interact with one or more permanent magnets to form a voice coil motor. One or more actuator arms extend from an opposite side of the actuator body.

A head gimbal assembly includes a transducer head, typically a magneto-resistive ("MR") head, which is distally attached to each of the actuator arms. To facilitate rotational movement of the actuator, the actuator assembly further includes the actuator body that has a bore and a pivot bearing cartridge engaged within the bore. Each magnetic disk includes opposing disk surfaces. Data may be recorded on a single surface or both along data annular regions. As such, the head stack assembly may be pivoted such that each transducer head is disposed adjacent the various data annular regions from adjacent the outer diameter to the inner diameter of each disk.

A typical head gimbal assembly further includes a load beam, a gimbal attached to an end of the load beam, and a slider supported by the gimbal. The transducer head is disposed within the slider. The load beam has a spring function that provides a "gram load" biasing force and a hinge function that permits the head to follow the surface contour of the spinning disk. The load beam has an actuator end that connects to the actuator arm and a gimbal end that connects to the gimbal that carries the head and transmits the gram load biasing force to the slider to "load" the slider against the disk. A rapidly spinning disk develops a laminar airflow above its surface that lifts the slider including the head away from the disk in opposition to the gram load biasing force. The head is said to be "flying" over the disk when in this state.

Conductive traces (copper for example) are laid on a dielectric layer (such as a polyimide) film formed on the head gimbal assembly. The dielectric layer electrically insulates the conductive traces from the gimbal (which may be formed of stainless steel for example). Such technologies are variously named TSA (Trace Suspension Assembly), NSL (No Service Loop), FOS (Flex On Suspension) and the like. These conductive traces interconnect the elements of the transducer head to the drive preamp and the circuits associated therewith. There are typically four conductive traces for the write and read differential pairs of the transducer head. The conductive traces are electrically connected to the transducer head at a trailing end of the slider. Such conductive traces are typically formed upon the dielectric layer through a deposition and/or etching process. The conductive traces include terminal pads which are disposed adjacent the slider. Various electrical connection techniques may be used to connect the terminal pads to the slider, such as gold ball bonding or wire bonding.

The slider may be glued to the gimbal using structural and conductive epoxies. The structural epoxy is used to hold the slider in place. The conductive epoxy (such as silver epoxy) is applied for electrical and thermal conductivity. The conductive epoxy provides a conductive path to electrical ground from the slider to the gimbal which in turn is connected to the load beam, the actuator arm and eventually the disk drive base. Such conductive path is not well controlled. In order to establish a controlled impedance path the conductive epoxy has to electrically breakdown. This involves application of voltage between the slider and the gimbal in excess of the "breakdown voltage". This can cause significant current flow in close proximity to the transducer head elements which may damage them. In addition, use of conductive epoxies has other problems. The thermal expansion tensor of the silver conductive epoxy has significant variations with temperature due to the presence of silver particles. Further, the silver conductive epoxy may cause fly height variation of the slider due to crown effects.

As disk drives have progressed to higher areal densities the fly height has correspondingly been reduced. The reduction in fly height has made head (slider)-to-disk interactions more likely. In particular, such close proximity of the slider to the disk may result in undesirable electrical discharge between the slider and the disk, as the electrical path between the disk and the slider may have less resistance than the electrical path from the slider to the gimbal through the conductive epoxy. Accordingly, there is a need in the art for a disk drive having an improved head stack assembly design in comparison to the prior art.

SUMMARY OF THE INVENTION

An aspect of the present invention can be regarded as a head stack assembly for a disk drive. The head stack assembly includes an actuator including an actuator arm. The head stack assembly further includes a load beam coupled to the actuator arm. The load beam is formed of an electrically conductive material. The head stack assembly further includes a gimbal coupled to the load beam. The gimbal is formed of an electrically conductive material. The head stack assembly further includes a dielectric layer disposed upon the gimbal. The head stack assembly further includes a slider supported by the gimbal. The head stack assembly further includes slider conductive pads disposed upon the dielectric layer with the dielectric layer interposed between the slider conductive pads and the gimbal. The slider conductive pads are electrically connected to the slider. The head stack assembly further includes a ground conductive pad disposed upon the dielectric layer with the dielectric layer interposed between the ground conductive pad and the gimbal. The ground conductive pad is electrically connected to the slider and the gimbal for electrically grounding the slider to the gimbal.

According to various embodiments, the dielectric layer may include a dielectric layer opening formed through the dielectric layer. The ground conductive pad may be electrically connected to the gimbal through an electrically conductive material disposed within the dielectric layer opening. The ground conductive pad may be electrically connected to the gimbal through conductive epoxy disposed within the dielectric layer opening. The conductive epoxy may be a silver epoxy. The ground conductive pad may be electrically connected to the gimbal through solder disposed within the dielectric layer opening. The ground conductive pad may be electrically connected to the gimbal through gold plating disposed within the dielectric layer opening. The ground conductive pad may be ball bonded to the slider. The slider may include a leading end and an opposing trailing end, and the slider conductive pads and the ground conductive pad may be disposed at the trailing end. In another embodiment, the slider conductive pads may be disposed at the trailing end, and the ground conductive pad may be disposed at the leading end. The slider conductive pads and the ground conductive pad may be metal traces formed upon the dielectric layer.

According to another aspect of the present invention, there is provided a head gimbal assembly for a disk drive. The head gimbal assembly further includes a load beam. The load beam is formed of an electrically conductive material. The head gimbal assembly further includes a gimbal coupled to the load beam. The gimbal is formed of an electrically conductive material. The head gimbal assembly further includes a dielectric layer disposed upon the gimbal. The head gimbal assembly further includes a slider supported by the gimbal. The head gimbal assembly further includes slider conductive pads disposed upon the dielectric layer with the dielectric layer interposed between the slider conductive pads and the gimbal. The slider conductive pads are electrically connected to the slider. The head gimbal assembly further includes a ground conductive pad disposed upon the dielectric layer with the dielectric layer interposed between the grounding conductive pad and the gimbal. The ground conductive pad is electrically connected to the slider and the gimbal for electrically grounding the slider to the gimbal.

According to another aspect of the present invention, there is provided a disk drive. The disk drive includes a disk drive base, a magnetic disk rotatable coupled to the disk drive base, and a head stack assembly rotatably coupled to the disk drive base adjacent the disk. The head stack assembly is as described above.

DESCRIPTION OF THE PREFERRED EMBODIMENTS

Figure 1:
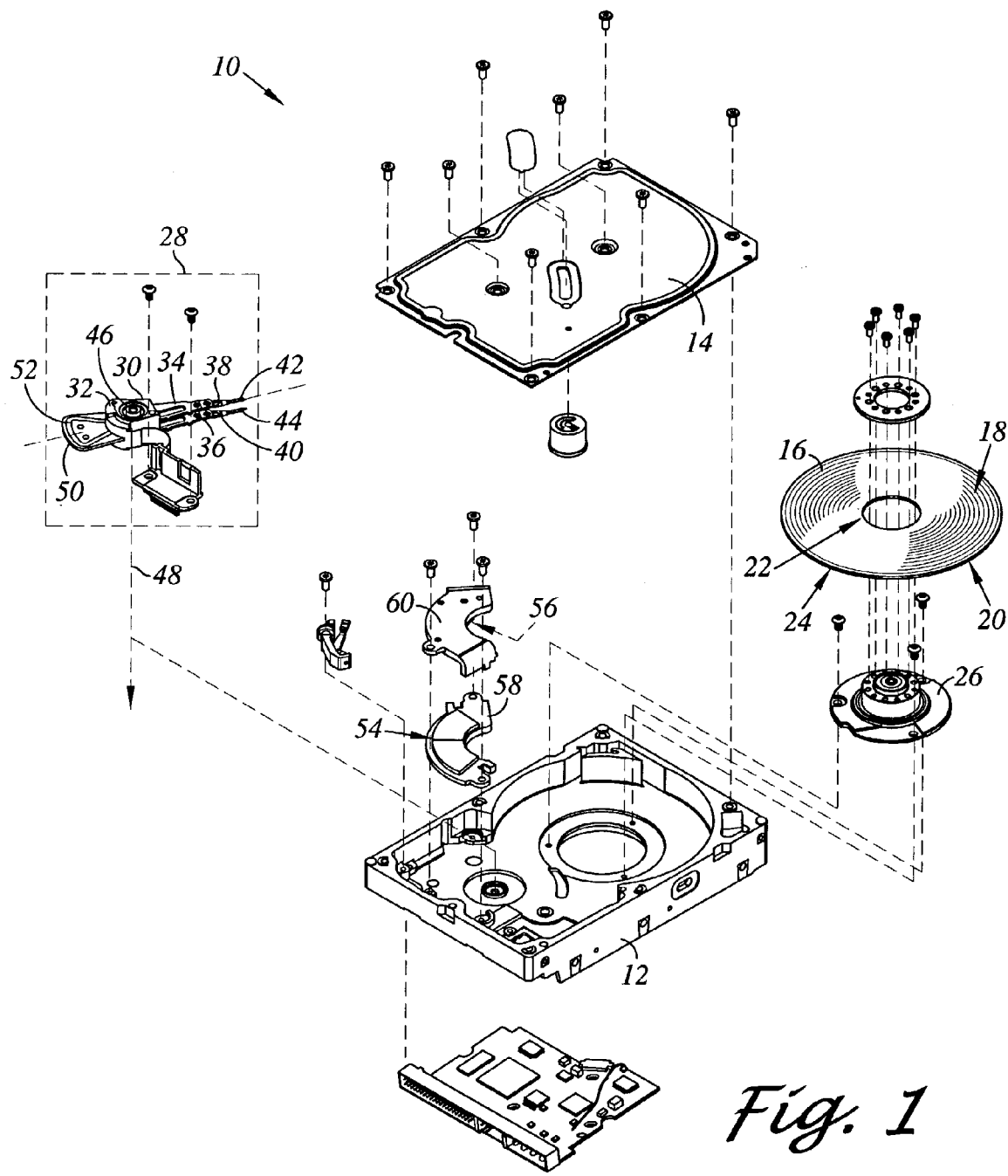
FIG. 1 is an exploded perspective view of a disk drive including a head stack assembly with head gimbal assemblies as constructed in accordance with the present invention.

Referring now to the drawings wherein the showings are for purposes of illustrating preferred embodiments of the present invention only, and not for purposes of limiting the same, FIGS. 1–9 illustrate a disk drive including a head stack assembly in accordance with the aspects of the present invention.

Referring now to FIG. 1, there is depicted an exploded perspective view of a disk drive 10 as constructed in accordance with an aspect of the present invention. The disk drive 10 includes a head disk assembly (HDA) and a printed circuit board assembly (PCBA). The head disk assembly includes a disk drive base 12 and a cover 14 that collectively house at least one magnetic disk 16. The disk 16 contains a plurality of tracks for storing data. The tracks are disposed upon opposing first and second disk surfaces 18, 20 of the disk 16 that extend between an inner disk edge 22 (associated with the inner diameter) and an outer disk edge 24 (associated with the outer diameter) of the disk 16. The head disk assembly further includes a spindle motor 26 for rotating the disk 16. The head disk assembly further includes a head stack assembly 28 rotatably attached to the disk drive base 12 in operable communication with the disk 16. The head stack assembly 28 includes a rotatable actuator 30. In the embodiment shown, the actuator 30 includes an actuator body 32 and actuator arms 34, 36 that extend from the actuator body 32. Distally attached to the actuator arms 34, 36 are head gimbal assemblies 38, 40. The head gimbal assemblies 38, 40 respectively support sliders 42, 44. It is contemplated that the number of actuator arms may vary depending upon the number of disks and disk surfaces utilized.

The actuator body 32 includes a bore, and the actuator 30 further includes a pivot bearing cartridge 46 engaged within the bore for facilitating the actuator body 32 to rotate between limited positions about an axis of rotation 48. The actuator 30 further includes a coil support 50 that extends from one side of the actuator body 32 opposite the actuator arms 34, 36. The coil support 50 is configured to support a coil 52. A pair of magnetic elements 54, 56 is supported by mounts 58, 60 which are attached to the disk drive base 12 (magnetic element 56 is indicated by the dashed lead line and it is understood the magnetic element 56 is disposed underneath the mount 60). The magnetic elements 54, 56 may be attached to the disk drive base 12 through other arrangements, such as the magnetic element 56 being directly mounted to the cover 12 which is mechanically engaged with the disk drive base 12. The coil 52 interacts with the magnetic elements 54, 56 to form a voice coil motor for controllably rotating the actuator 30.

Figure 2:
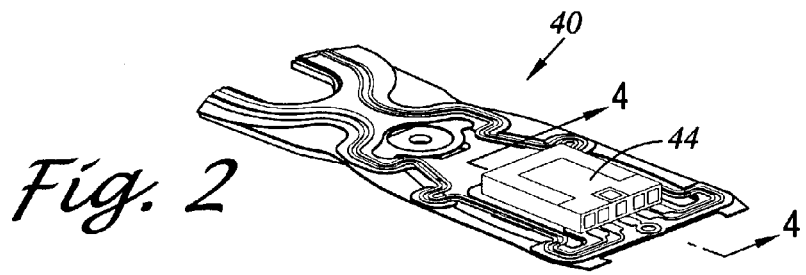
FIG. 2 is an enlarged perspective view of a portion of a head gimbal assembly of FIG. 1.
Figure 3:
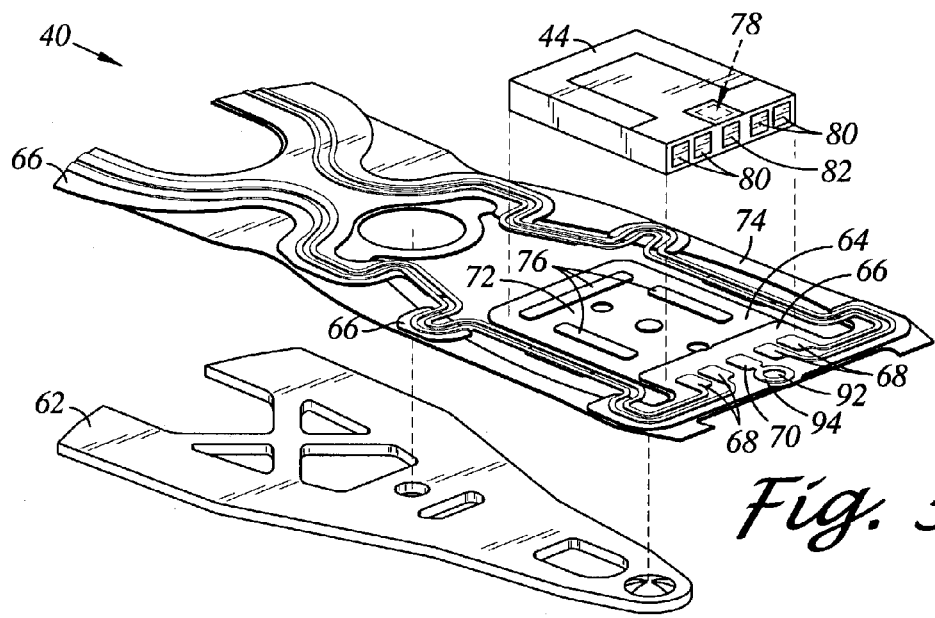
FIG. 3 is an enlarged exploded view of the portion of the head gimbal assembly of FIG. 2.
Figure 4:
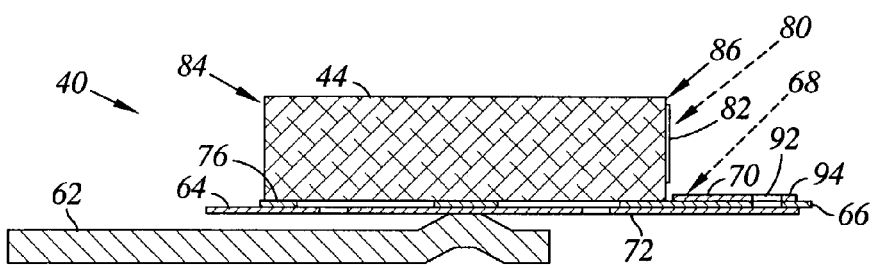
FIG. 4 is an enlarged side view of the portion of the head gimbal assembly of FIG. 2 as seen along axis 4—4.
Figure 5:
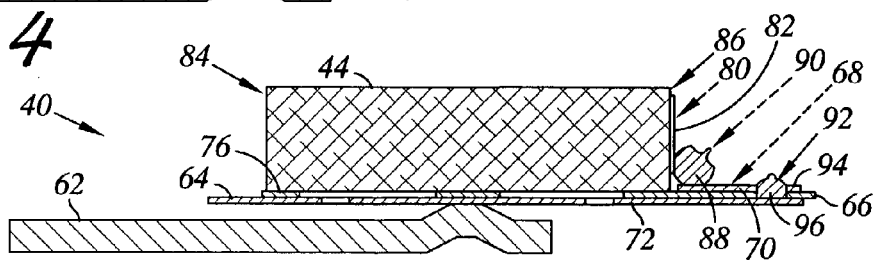
FIG. 5 is the side view of the portion of the head gimbal assembly of FIG. 4 with electrical connections shown.

FIG. 2 is an enlarged perspective view of a portion of the head gimbal assembly 40 of FIG. 1. For ease of discussion, certain electrical connections (discussed in detail below) are not depicted. FIG. 3 is an enlarged exploded view of the portion of the head gimbal assembly 40 of FIG. 2. FIG. 4 is an enlarged side view of the portion of the head gimbal assembly 40 of FIG. 2 as seen along axis 4—4. FIG. 5 depicts the side view of the portion of the head gimbal assembly 40 of FIG. 4 with electrical connections shown.

An aspect of the present invention can be regarded as the head stack assembly 28 for the disk drive 10. The head stack assembly 28 includes the actuator 30 including an actuator arm, such as actuator arm 36. The head stack assembly 28 further includes a load beam 62 coupled to the actuator arm 36. The load beam 62 is formed of an electrically conductive material. The head stack assembly 28 further includes a gimbal 64 coupled to the load beam 62. The gimbal 64 is formed of an electrically conductive material. The head stack assembly 28 further includes a dielectric layer 66 disposed upon the gimbal 64. The head stack assembly 28 further includes the slider 44 supported by the gimbal 64. The head stack assembly 28 further includes slider conductive pads 68 disposed upon the dielectric layer 66 with the dielectric layer 66 interposed between the slider conductive pads 68 and the gimbal 64. The slider conductive pads 68 are electrically connected to the slider 44. The head stack assembly 28 further includes a ground conductive pad 70 disposed upon the dielectric layer 66 with the dielectric layer 66 interposed between the ground conductive pad 70 and the gimbal 64. The ground conductive pad 70 is electrically connected to the slider 44 and the gimbal 64 for electrically grounding the slider 44 to the gimbal 64.

It is contemplated that the head stack assembly 28 includes the actuator arm 36 and the attached head gimbal assembly 40. According to another aspect of the present invention, the head gimbal assembly 40 includes the load beam 62, the dielectric layer 64, the slider 44, the slider conductive pads 68, and the ground conductive pad 70 as described above. Further, according to another aspect of the present invention there is provided the disk drive 10 including the disk drive base 12 and the head stack assembly 28 rotatably coupled to the disk drive base 12.

It is contemplated that the load beam 62 and the gimbal 64 may be formed of an electrically conductive material such as stainless steel. The actuator arm 36 which is coupled to the disk drive base 12 and supports the load beam 62 may further be electrically conductive. In this regard, it is understood that electrical connection between the gimbal 64 and the slider 44 facilitates an electrical path to ground for the slider 44.

In further detail, the gimbal 64 may include a gimbal body 72 which is supported by gimbal outriggers 74 in a hinge-like manner to allow the gimbal body 72 to move during "flight". The dielectric layer may include dielectric layer pads 76 disposed upon the gimbal body 72. The slider 44 may be supported by the gimbal 64 through attachment of the slider 44 to the gimbal body 72. In this regard, the slider 44 may be disposed upon the dielectric layer pads 76. In those regions about the dielectric layer pads 76 structural epoxy may be used for secure attachment of the slider 44 to the gimbal 64 while electrically insulating the slider 44 and the gimbal 64.

The slider 44 includes a transducer head 78 disposed within the slider 44 (as indicated in dashed line). The slider 44 may further include electrical connections 80 which are electrically connected to the transducer head 78 internally within the slider 44. In addition, the slider 44 may include a ground connection 82. The slider 44 may include a leading end 84 and an opposing trailing end 86. In the embodiment shown, the electrical connections 80 and the ground connection 82 are disposed at the trailing end 86 of the slider 44.

The slider 44 may be electrically connected to the ground conductive pad 70 with the ground connection 82 electrically connected to the ground conductive pad 70 such as through ball bonding, solder ball bonding or wire bonding. As shown in FIG. 5, a gold ball bond 88 may be utilized. Similarly, the slider 44 may be electrically connected to the slider conductive pads 68 with the electrical connections 80 electrically connected to the slider conductive pads 68 such as through ball bonding, solder ball bonding or wire bonding. Referring to FIG. 5, gold ball bonds 90 may be utilized (as indicated in FIG. 5 in dashed lead line as the gold ball bond 90 is disposed behind the gold ball bond 88 in this view).

The slider conductive pads 68 and the ground conductive pad 70 may be metal traces formed upon the dielectric layer 66. These may be formed of copper and deposited and/or etched upon the dielectric layer 66.

The dielectric layer 66 may include a dielectric layer opening 92 formed through the dielectric layer 66. The dielectric layer opening 92 may be circular, however other shapes are contemplated. The dielectric layer opening 92 is formed to expose the underlying gimbal 64. A conductive ring 94 may extend from the ground conductive pad 70 and may be formed about the dielectric layer opening 92. The ground conductive pad 70 may be electrically connected to the gimbal 64 through an electrically conductive material 96 disposed within the dielectric layer opening 66. The conductive ring 94 and the dielectric layer opening 66 may form a cup-like boundary for containing the conductive material 96. The conductive material 96 may take the form of a conductive epoxy (such as a silver epoxy). The dielectric layer opening 66 may be filled with conductive epoxy such as through a syringe or using a mask and screening technique. Once the conductive epoxy is cured, a voltage may be applied across the conductive epoxy in excess of the associated breakdown voltage for establishing a controlled impedance within the epoxy. Subsequently, the slider 44 may be attached to the gimbal 64. In addition, it is contemplated that the conductive material 96 may take other forms such as solder or even gold plating.

Figure 6:
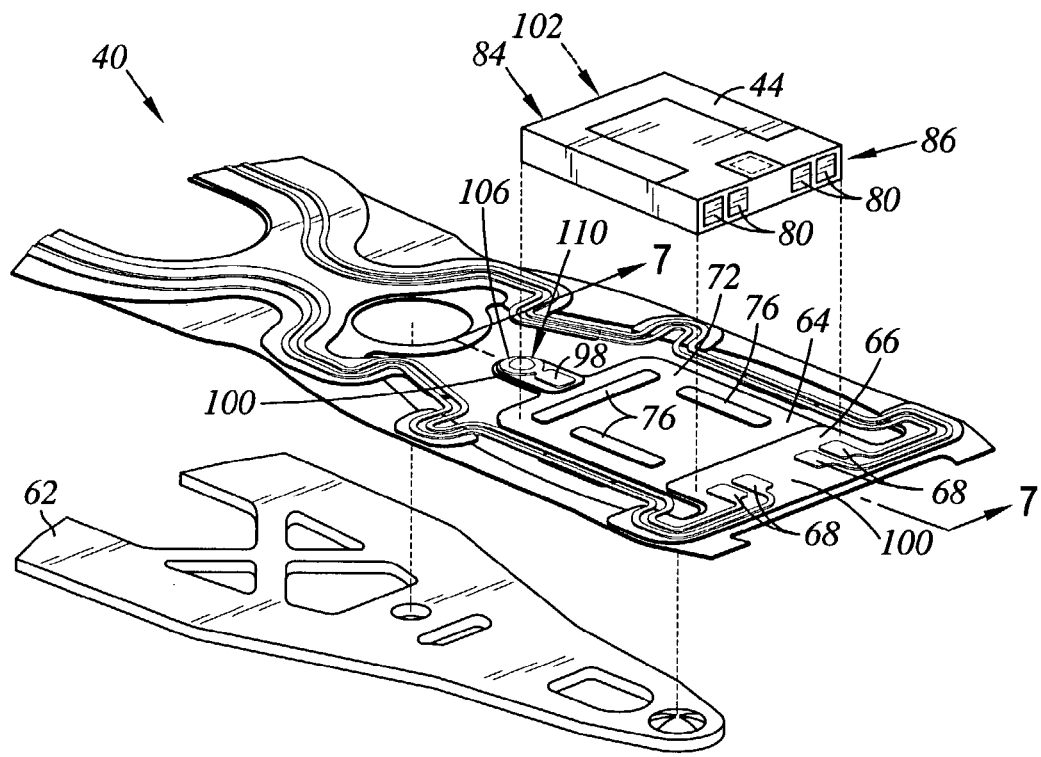
FIG. 6 is an exploded view of a portion of a head gimbal assembly similar to FIG. 3, however, according to another embodiment of an aspect of the present invention.
Figure 7:
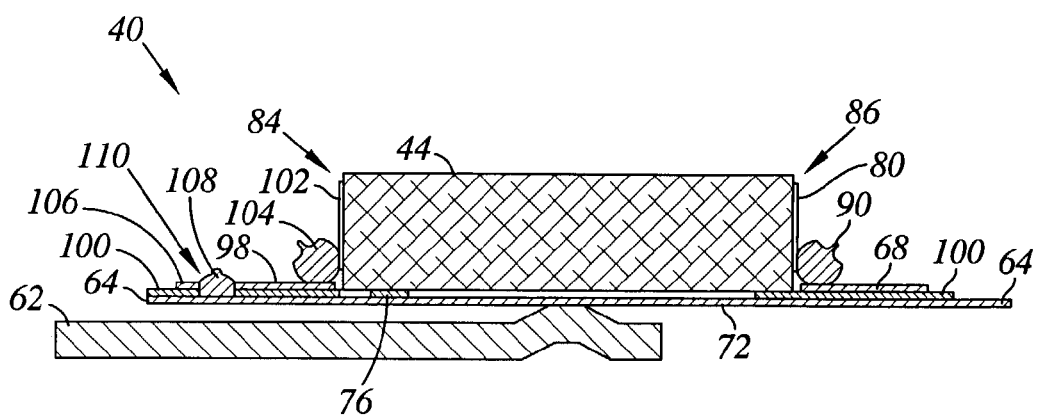
FIG. 7 is an enlarged side view of the portion of the head gimbal assembly of FIG. 6 as seen along axis 7—7, however, with the head gimbal assembly being assembled and electrical connections shown.

Referring now to FIGS. 6 and 7, there is depicted another embodiment according another aspect of the present invention. FIG. 6 is an exploded view of a portion of the head gimbal assembly 40 similar to FIG. 3 however with the differences noted. FIG. 7 is an enlarged side view of the portion of the head gimbal assembly 40 of FIG. 6 as seen along axis 7—7, however with the head gimbal assembly 40 being assembled and electrical connections shown. In this embodiment, there may be disposed a dielectric layer 100 similar to the dielectric layer 66 however the dielectric layer 100 may extend along the gimbal body 72 (indicted with dashed lead line) is the slider 44 includes a ground conductive pad 98 similar to the ground conductive pad 70, however the ground conductive pad 98 is disposed at the leading end 84 of the slider 44. The slider 44 may include a ground connection 102 similar to the ground connection 82, however the ground connection 102 is disposed at the leading end 84 of the slider 44.

A dielectric layer opening 104 may be disposed at the leading end 84. The ground connection 102 is electrically connected to the ground conductive pad 98 with an electrically conductive material such as a gold ball bond 104. Further, a conductive ring 106 may extend from the ground conductive pad 98. An electrically conductive material 108, such as silver epoxy, solder or gold plating, may be disposed within the conductive ring 106 and a dielectric layer opening 110 for electrically connecting the gimbal 64 to the ground conductive pad 98.

Figure 8:
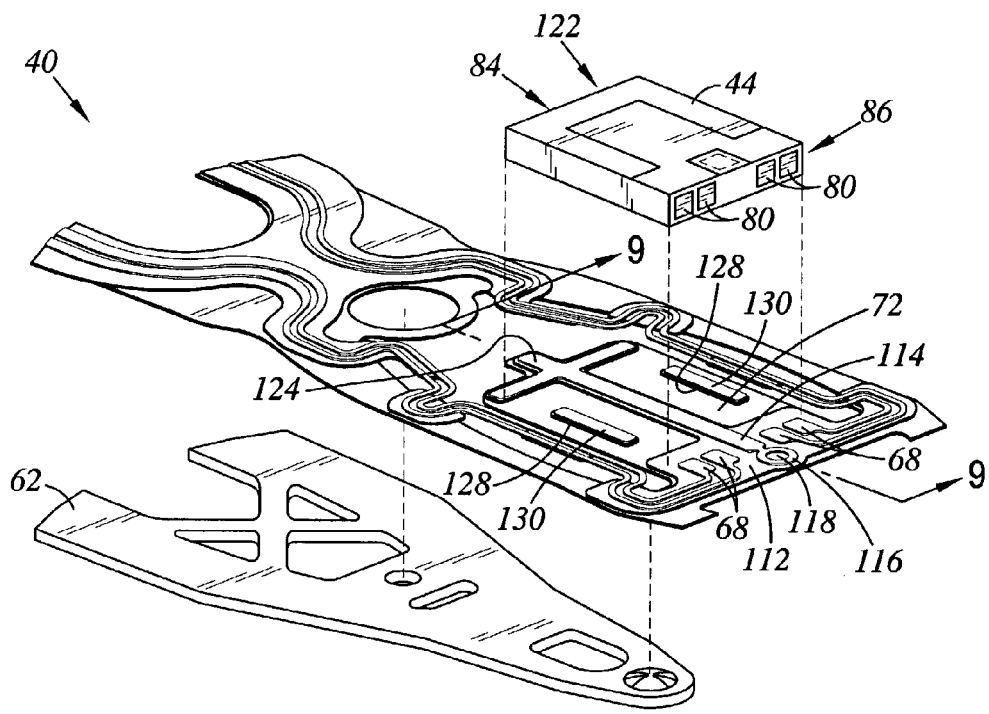
FIG. 8 is an exploded view of a portion of a head gimbal assembly similar to FIG. 3, however, according to another embodiment of an aspect of the present invention.
Figure 9:
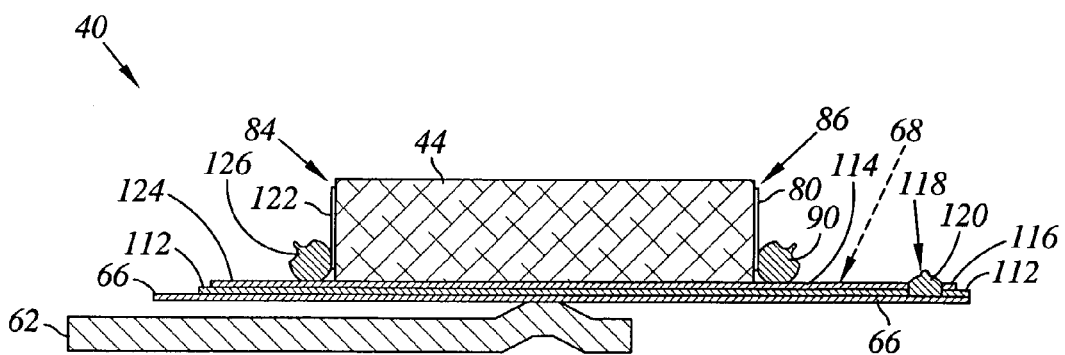
FIG. 9 is an enlarged side view of the portion of the head gimbal assembly of FIG. 8 as send along axis 9—9, however, with the head gimbal assembly being assembled and electrical connections shown.

Referring now to FIGS. 8 and 9, there is depicted another embodiment according to another aspect of the present invention. FIG. 8 is an exploded view of a portion of the head gimbal assembly 40 similar to FIG. 3, however with the differences noted. FIG. 9 is an enlarged side view of the portion of the head gimbal assembly 40 of FIG. 8 as seen along axis 9—9, however, with the head gimbal assembly 40 being assembled and electrical connections shown. The slider 44 is supported by the gimbal body 72. In this embodiment, there may be a dielectric layer 112 disposed upon the gimbal body 72. The dielectric layer 112 is similar to the dielectric layer 66, however, the dielectric layer 112 may extend along the gimbal body 72 from the trailing end 86 to the leading end 84 of where the slider 44 is supported by the gimbal body 72.

A ground conductive strip 114 is disposed upon the dielectric layer 112. The ground conductive strip 114 includes a conductive ring 116. The trailing end 86 of the slider 44 may be disposed generally adjacent the conductive ring 116. The dielectric layer 112 may include a dielectric layer opening 118. The conductive ring 116 may be disposed about the dielectric layer opening 118. It is contemplated that the conductive ring 116 and the dielectric layer opening 118 may be disposed at other locations with respect to the slider 44, such as adjacent the leading end 84 of the slider 44 for example. An electrically conductive material 120, such as silver epoxy, solder, or gold plating, may be disposed within the conductive ring 116 and the dielectric layer opening 118 for electrically connecting the gimbal 66 to the ground conductive strip 114. The slider 44 may include a ground connection 122 disposed at the leading end 84 of the slider 44. The ground conductive strip 114 may include a ground conductive pad 124 disposed at an opposing end of the ground conductive strip 114 from the conductive ring 116. The ground connection 122 is electrically connected to the ground conductive pad 124 with an electrically conductive material such as a gold ball bond 126. As such the slider 44 may be electrically grounded to the gimbal 64 through the gold ball bond 126. Moreover, the slider 44 is contemplated to be in contact with the ground conductive strip 114. In this regard, the slider 44 may be additionally electrically grounded to the gimbal 64 through such contact.

Further, the dielectric layer 112 may include slider support portions 128. Slider support layers 130 may be disposed upon the slider support portions 128. The slider support layers 130 may be formed of the same material used to form the ground conductive strip 114 and may be disposed upon the slider support portions 128. The slider support layers 130 may be formed to the same height as the ground conductive strip 114. The slider 44 may be disposed upon the slider support layers 130 and the ground conductive strip 114. A structural epoxy may be used to attach the slider 44 and may reside upon the gimbal body 72 in those regions between the slider support layers 130 and the ground conductive strip 114.

We claim:

1. A head stack assembly for a disk drive, the head stack assembly comprising:
   an actuator including an actuator arm;
   a load beam coupled to the actuator arm, the load beam being formed of an electrically conductive material;
   a gimbal coupled to the load beam, the gimbal being formed of an electrically conductive material;
   a dielectric layer disposed upon the gimbal;
   a slider supported by the gimbal, the slider including a leading end and an opposing trailing end;
   slider conductive pads disposed upon the dielectric layer with the dielectric layer interposed between the slider conductive pads and the gimbal, the slider conductive pads being disposed at the trailing end, the slider conductive pads being electrically connected to the slider; and
   a ground conductive pad disposed upon the dielectric layer with the dielectric layer interposed between the ground conductive pad and the gimbal, the ground conductive pad being disposed at the leading end, the ground conductive pad being electrically connected to the slider and the gimbal for electrically grounding the slider to the gimbal.

2. The head stack assembly of claim 1 wherein the dielectric layer includes a dielectric layer opening formed through the dielectric layer, the ground conductive pad is electrically connected to the gimbal through an electrically conductive material disposed within the dielectric layer opening.

3. The head stack assembly of claim 1 wherein the ground conductive pad is electrically connected to the gimbal through conductive epoxy disposed within the dielectric layer opening.

4. The head stack assembly of claim 3 wherein the conductive epoxy is a silver epoxy.

5. The head stack assembly of claim 1 wherein the ground conductive pad is electrically connected to the gimbal through solder disposed within the dielectric layer opening.

6. The head stack assembly of claim 1 wherein the ground conductive pad is electrically connected to the gimbal through gold plating disposed within the dielectric layer opening.

7. The head stack assembly of claim 1 wherein the ground conductive pad is ball bonded to the slider.

8. The head stack assembly of claim 1 wherein the slider conductive pads and the ground conductive pad are metal traces formed upon the dielectric layer.

9. A disk drive comprising:
   a disk drive base;
   a magnetic disk rotatably coupled to the disk drive base;
   a head stack assembly rotatably coupled to the disk drive base adjacent the disk, the head stack assembly including:
   an actuator including an actuator arm;
   a load beam coupled to the actuator arm, the load beam being formed of an electrically conductive material;
   a gimbal coupled to the load beam, the gimbal being formed of an electrically conductive material;
   a dielectric layer disposed upon the gimbal;
   a slider supported by the gimbal, the slider including a leading end and an opposing trailing end;
   slider conductive pads disposed upon the dielectric layer with the dielectric layer interposed between the slider conductive pads and the gimbal, the slider conductive pads being disposed at the trailing end, the slider conductive pads being electrically connected to the slider; and a ground conductive pad disposed upon the dielectric layer with the dielectric layer interposed between the ground conductive pad and the gimbal, the ground conductive pad being disposed at the leading end, the ground conductive pad being electrically connected to the slider and the gimbal for electrically grounding the slider to the gimbal.

10. The disk drive of claim 9 wherein the dielectric layer includes a dielectric layer opening formed through the dielectric layer, the ground conductive pad is electrically connected to the gimbal through an electrically conductive material disposed within the dielectric layer opening.

11. The disk drive of claim 9 wherein the ground conductive pad is electrically connected to the gimbal through conductive epoxy disposed within the dielectric layer opening.

12. The disk drive of claim 11 wherein the conductive epoxy is a silver epoxy.

13. The disk drive of claim 9 wherein the ground conductive pad is electrically connected to the gimbal through solder disposed within the dielectric layer opening.

14. The disk drive of claim 9 wherein the ground conductive pad is electrically connected to the gimbal through gold plating disposed within the dielectric layer opening.

15. The disk drive of claim 9 wherein the ground conductive pad is ball bonded to the slider.

16. The disk drive of claim 9 wherein the slider conductive pads and the ground conductive pad are metal traces formed upon the dielectric layer.

17. A head gimbal assembly for a disk drive, the head gimbal assembly comprising:
   a load beam formed of an electrically conductive material;
   a gimbal coupled to the load beam, the gimbal being formed of an electrically conductive material;
   a dielectric layer disposed upon the gimbal;
   a slider supported by the gimbal, the slider including a leading end and an opposing trailing end;
   slider conductive pads disposed upon the dielectric layer with the dielectric layer interposed between the slider conductive pads and the gimbal, the slider conductive pads being disposed at the trailing end, the slider conductive pads being electrically connected to the slider; and
   a ground conductive pad disposed upon the dielectric layer with the dielectric layer interposed between the ground conductive pad and the gimbal, the ground conductive pad being disposed at the leading end, the ground conductive pad being electrically connected to the slider and the gimbal for electrically grounding the slider to the gimbal.

18. The head gimbal assembly of claim 17 wherein the dielectric layer includes a dielectric layer opening formed through the dielectric layer, the ground conductive pad is electrically connected to the gimbal through an electrically conductive material disposed within the dielectric layer opening.

19. The head gimbal assembly of claim 17 wherein the ground conductive pad is electrically connected to the gimbal through conductive epoxy disposed within the dielectric layer opening.

20. The head gimbal assembly of claim 19 wherein the conductive epoxy is a silver epoxy.

21. The head gimbal assembly of claim 17 wherein the ground conductive pad is electrically connected to the gimbal through solder disposed within the dielectric layer opening.

22. The head gimbal assembly of claim 17 wherein the ground conductive pad is electrically connected to the gimbal through gold plating disposed within the dielectric layer opening.

23. The head gimbal assembly of claim 17 wherein the ground conductive pad is ball bonded to the slider.

24. The head gimbal assembly of claim 17 wherein the slider conductive pads and the ground conductive pad are metal traces formed upon the dielectric layer.

* * * * *